(12) United States Patent
Tabares et al.

(10) Patent No.: US 9,759,118 B2
(45) Date of Patent: Sep. 12, 2017

(54) COMPACT DEVICE FOR EXHAUST GAS MANAGEMENT IN AN EGR SYSTEM

(71) Applicant: BorgWarner Emissions Systems Spain, S.L.U., Vigo, Pontevedra (ES)

(72) Inventors: Iago Gonzalez Tabares, Ourense (ES); Xoan Xose Hermida Dominguez, Pontevedra (ES)

(73) Assignee: BorgWarner Emissions Systems Spain, S.L.U., Vigo, Pontevedra (ES)

( * ) Notice: Subject to any disclaimer, the term of this patent is extended or adjusted under 35 U.S.C. 154(b) by 81 days.

(21) Appl. No.: 14/778,200

(22) PCT Filed: Mar. 18, 2014

(86) PCT No.: PCT/EP2014/055405
§ 371 (c)(1),
(2) Date: Sep. 18, 2015

(87) PCT Pub. No.: WO2014/147064
PCT Pub. Date: Sep. 25, 2014

(65) Prior Publication Data
US 2016/0281580 A1    Sep. 29, 2016

(30) Foreign Application Priority Data
Mar. 19, 2013   (EP) ................................... 13382096

(51) Int. Cl.
| | | |
|---|---|---|
| *F01N 3/18* | (2006.01) | |
| *F01N 13/18* | (2010.01) | |
| *F01N 3/021* | (2006.01) | |
| *F01N 3/02* | (2006.01) | |
| *F02M 26/15* | (2016.01) | |

(Continued)

(52) U.S. Cl.
CPC ......... *F01N 13/1838* (2013.01); *F01N 3/021* (2013.01); *F01N 3/0205* (2013.01); *F02M 26/15* (2016.02); *F02M 26/25* (2016.02); *F02M 26/26* (2016.02); *F02M 26/30* (2016.02);
(Continued)

(58) Field of Classification Search
CPC ......... F02M 26/22–26/33; F01N 3/021; F01N 13/18
See application file for complete search history.

(56) References Cited

U.S. PATENT DOCUMENTS 4,055,158 A * 10/1977 Marsee .................. F02M 26/35
123/568.12
5,205,265 A * 4/1993 Kashiyama ............. F02D 21/08
123/568.12
(Continued)

FOREIGN PATENT DOCUMENTS

EP    2194351 A1    6/2010
EP    2336538 A1    6/2011
(Continued)

*Primary Examiner* — Patrick Maines
(74) *Attorney, Agent, or Firm* — BrooksGroup

(57) ABSTRACT

The present invention is a compact device for exhaust gas management in an EGR (Exhaust Gas Recirculation) system configured for occupying a smaller space with respect to the space commonly occupied by a set of elements present in an EGR system, which device is suitable for being coupled to a PF or DPF filter (PF is the abbreviation for particulate filter and DPF is the abbreviation for diesel particulate filter), whichever is appropriate.

7 Claims, 6 Drawing Sheets

(51) Int. Cl.
  *F02M 26/25* (2016.01)
  *F02M 26/26* (2016.01)
  *F02M 26/30* (2016.01)
  *F02M 26/32* (2016.01)

(52) U.S. Cl.
  CPC ......... *F02M 26/32* (2016.02); *F01N 2240/20* (2013.01); *F01N 2410/00* (2013.01); *Y02T 10/20* (2013.01)

(56) References Cited

U.S. PATENT DOCUMENTS

| | | | | |
|---|---|---|---|---|
| 6,141,961 | A * | 11/2000 | Rinckel | F01N 3/043 60/274 |
| 6,155,042 | A | 12/2000 | Perset et al. | |
| 2007/0289581 | A1* | 12/2007 | Nakamura | F28D 9/0025 123/568.12 |
| 2010/0313858 | A1 | 12/2010 | Springer et al. | |
| 2011/0239634 | A1* | 10/2011 | Reynolds | F01N 5/02 60/320 |
| 2013/0047591 | A1* | 2/2013 | Moehlmann | F01N 5/02 60/320 |
| 2013/0061584 | A1* | 3/2013 | Gerges | F01N 5/02 60/320 |
| 2015/0308388 | A1* | 10/2015 | Castano Gonzalez | F28D 7/16 123/568.12 |
| 2016/0010531 | A1* | 1/2016 | Dom Nguez | |
| 2016/0348615 | A1* | 12/2016 | Fischer | F02M 35/02 |

FOREIGN PATENT DOCUMENTS

| | | | |
|---|---|---|---|
| EP | 2354520 A2 | 8/2011 | |
| FR | 2894624 A1 * | 6/2007 | ............ F02B 37/18 |
| FR | 2920834 A1 | 3/2009 | |
| FR | 2923535 A1 | 5/2009 | |
| JP | 2014043816 A * | 3/2014 | |

* cited by examiner

COMPACT DEVICE FOR EXHAUST GAS MANAGEMENT IN AN EGR SYSTEM

OBJECT OF THE INVENTION

The present invention is a compact device for exhaust gas management in an EGR (Exhaust Gas Recirculation) system configured for occupying a smaller space with respect to the space commonly occupied by a set of elements present in an EGR system, which device is suitable for being coupled to a PF or DPF filter (PF is the abbreviation for particulate filter and DPF is the abbreviation for diesel particulate filter), whichever is appropriate.

BACKGROUND OF THE INVENTION

Exhaust gas management in EGR systems for combustion engines requires a number of auxiliary devices which must be placed in the engine compartment. The improvement of such systems has given rise to an increasing number of auxiliary components competing for space.

The state of the art has dealt with the space shortage problem by finding spaces in which each of the components can fit and then establishing a fluidic communication between said components by means of conduits until establishing the suitable circuit. Improvement in packing has also been in this direction in which each component has been envisaged to have a shape that is consistent with the shape of the cavity or space where it can be housed.

This strategy gives rise to a high degree of component dispersion because the available spaces are not usually in adjacent locations, and it therefore also gives rise to a similarly large number of conduits so that the inlets and outlets of each component are suitably connected. These conduits also require space and have pressure losses along their path.

One of the components present in EGR systems today is the PF/DPF filter due to increasingly stricter environmental regulations. This filter has a large diameter because the flow rate that it has to filter is also high. The present invention proposes a device formed by a plurality of components characteristic of an EGR system configured such that said plurality of components is packed into a single body without the need to establish a connection by means of additional conduits after installation. As a result, the plurality of components forms a single compact body containing all the functions that can be provided by assembling together the components thereof.

Particularly, the configuration of the device of the invention uses the large diameter of the PF/DPF filter to adapt to its outlet such that two exhaust gas connections are carried out in the same coupling element, fitting the components located downstream in a transverse arrangement which results in a very small space requirement. As will be described further below, the same device also solves other technical problems.

DESCRIPTION OF THE INVENTION

The device of the invention is a compact device for exhaust gas management in an EGR system suitable for being directly coupled on a PF/DPF filter taking advantage of the large-diameter outlet offered by said filter.

This filter, which usually has a cylindrical configuration, extends along a longitudinal direction X-X' at the end of which the filter has an outlet opening. The device of the invention is coupled on this opening, receiving all the filtered exhaust gases exiting the engine to handle the subsequent management thereof.

The device of the invention comprises:
a coupling base with a seating suitable for being coupled to the filter covering its opening,
an exhaust conduit extending according to a longitudinal direction Y-Y',
a heat exchanger comprising at least a first coolant fluid connection and a second coolant fluid connection both for the circulation of the coolant liquid; and where the exchanger extends along a longitudinal direction Z-Z' between an inlet for the gas to be cooled and an outlet for the cooled gas.

The coupling base of the device is suitable for being coupled to the PF/DPF filter such that the coupling base receives all the exhaust gases exiting the filter. The configuration of this base coincides with the configuration of the section of the filter. As indicated, the most common configuration of PF/DPF filters is a cylindrical configuration. In this particular case, the section is circular also giving rise to a coupling base with a seating having a circular configuration.

The remaining components are installed on the coupling base such that, in the preferred example, the body of the coupling base is the structural element on which almost all the components are installed forming a single body.

The longitudinal direction X-X' has been identified on the PF/DPF filter. This longitudinal direction is the main direction of the exhaust gas flow through the filter. In the preferred example, the seating of the coupling base is in a plane perpendicular to the longitudinal direction X-X'.

Two essential components are highlighted, an exhaust conduit extending along a longitudinal direction Y-Y' and a heat exchanger which also extends along a longitudinal direction Z-Z'. The identification of the longitudinal directions along which these two components extend is relevant because the special arrangement thereof allows an overall compact design, as will be seen below in an additional geometric condition.

The coupling base located at the outlet of the PF/DPF filter gives rise to an inner chamber between said filter and said coupling base into which the exhaust gases exiting the filter flow. Both the exhaust conduit and the heat exchanger are in fluidic communication with this inner chamber of the coupling base such that the exhaust gases exiting the filter can only go either to the exhaust conduit or to the heat exchanger.

The device of the invention also comprises:
an intermediate chamber in turn comprising:
  a gas inlet in fluidic connection with the outlet of the heat exchanger,
  a first outlet connected to the EGR conduit to provide cooled exhaust gases towards the EGR valve of the EGR system,
  a second outlet connected to the exhaust conduit.

By means of these connections, the exhaust gases going through the heat exchanger flow into the intermediate chamber through its only inlet. These gases cooled by the heat exchanger have two alternatives, they are either directed to the first outlet connected to the EGR conduit to provide cooled exhaust gases to the engine intake with the management of an EGR valve or else they are directed to the second outlet which is in communication with the exhaust conduit. In the embodiment, this second outlet connected to the exhaust conduit has access to this exhaust conduit through one side.

Once the main components of the device are established, it is verified that:
the coupling base has a first connection of the coupling base in fluidic connection with the inlet of the heat exchanger,
the longitudinal direction Z-Z' of the heat exchanger is misaligned with respect to the longitudinal direction X-X' of the filter,
the coupling base has a second connection of the coupling base arranged in opposition with respect to the first connection of the coupling base according to the longitudinal axis X-X' of the filter, this second connection of the coupling base being in fluidic connection with the exhaust conduit where the longitudinal direction Y-Y' of said exhaust conduit is essentially parallel to the longitudinal direction of the heat exchanger and misaligned with respect to the longitudinal direction X-X' of the filter.

These first conditions establish the position and orientation both of the heat exchanger and of the exhaust conduit. The longitudinal directions (Y-Y', Z-Z') of both components are essentially parallel to one another but misaligned with respect to the longitudinal direction X-X' defined by the PF/DPF filter. This misalignment means that the device is not a longitudinal prolongation of the PF/DPF filter according to its longitudinal direction X-X'.

Additionally, the first connection for feeding the heat exchanger and the second connection for feeding the exhaust conduit are located in opposition. For example, in the embodiment which will be described in greater detail below, the PF/DPF filter is cylindrical giving rise to a circular configuration of the coupling base. In this circular configuration of the coupling base, the first connection and the second connection are located such that they are diametrically opposite. This means that the heat exchanger extends transversely, primarily the distance of the width of the PF/DPF filter. with the advantage that its length is not limited by the width of said filter. The term transverse indicates that it is traversed with respect to the longitudinal direction of reference, in this case X-X', or that it is considerably deflected from this same direction of reference. A particular case of transverse arrangement is the condition of perpendicularity.

Given that the exhaust conduit prolongs essentially parallel to the heat exchanger, the outlet is connected to the exhaust conduit by means of the intermediate chamber at the end of the length of the heat exchanger. It is sufficient for the exhaust conduit to be long enough so as to enable this fluidic communication between the outlet of the heat exchanger and the exhaust conduit.

Even though the orientation between both components, the heat exchanger and the exhaust conduit, is essentially parallel, the orientation of both is transversal but not necessarily perpendicular with respect to the longitudinal direction X-X' of the filter. Furthermore, a small angle, for example a 30 degree angle, prevents the need to superpose the heat exchanger on the exhaust conduit according to planes perpendicular to the direction X-X' to thereby take even further advantage of the space. This angle will mainly depend on the thickness of the heat exchanger and on the gap between the first connection and the second connection arranged in opposition in the coupling base.

It must also be verified that:
the second outlet of the intermediate chamber in fluidic connection with the exhaust conduit is located on the side of the exhaust conduit; and,
the device comprises a valve suitable for having at least two end positions, a first end position for closing the fluidic connection between the intermediate chamber and the exhaust conduit leaving the passage through the exhaust conduit free; and a second end position for closing the exhaust conduit leaving the fluidic connection between the intermediate chamber and the exhaust conduit free.

This position of the intermediate chamber makes it possible to arrange the heat exchanger transversely to the direction X-X' such that its length covers the width of the filter; and if the latter is longer, the connection with the exhaust conduit can be established. With respect to the occupied space, given that the heat exchanger occupies part of the width of the PF/DPF filter, the length of the filter only increases a little more than the width of the heat exchanger; and the device emerges laterally by a length which does not correspond with the total length of the heat exchanger given that part of its length extends transversely to the filter taking advantage of its width.

Finally, the presence of a valve allowing at least two end positions is required. This valve manages the flow heading directly towards the exhaust through the exhaust conduit, or in contrast causes the flow to go through the heat exchanger towards the EGR valve or to go back towards the exhaust after passing through the exchanger.

DESCRIPTION OF THE DRAWINGS

The foregoing and other advantages and features of the invention will be better understood from the following detailed description of a preferred embodiment given only by way of illustrative and non-limiting example in reference to the attached drawings.

FIG. 2A shows the valve closing the exhaust conduit, and FIG. 2B shows the same valve closing communication from the outlet of the heat exchanger towards the exhaust.

DETAILED DESCRIPTION OF THE INVENTION

Figure 1:
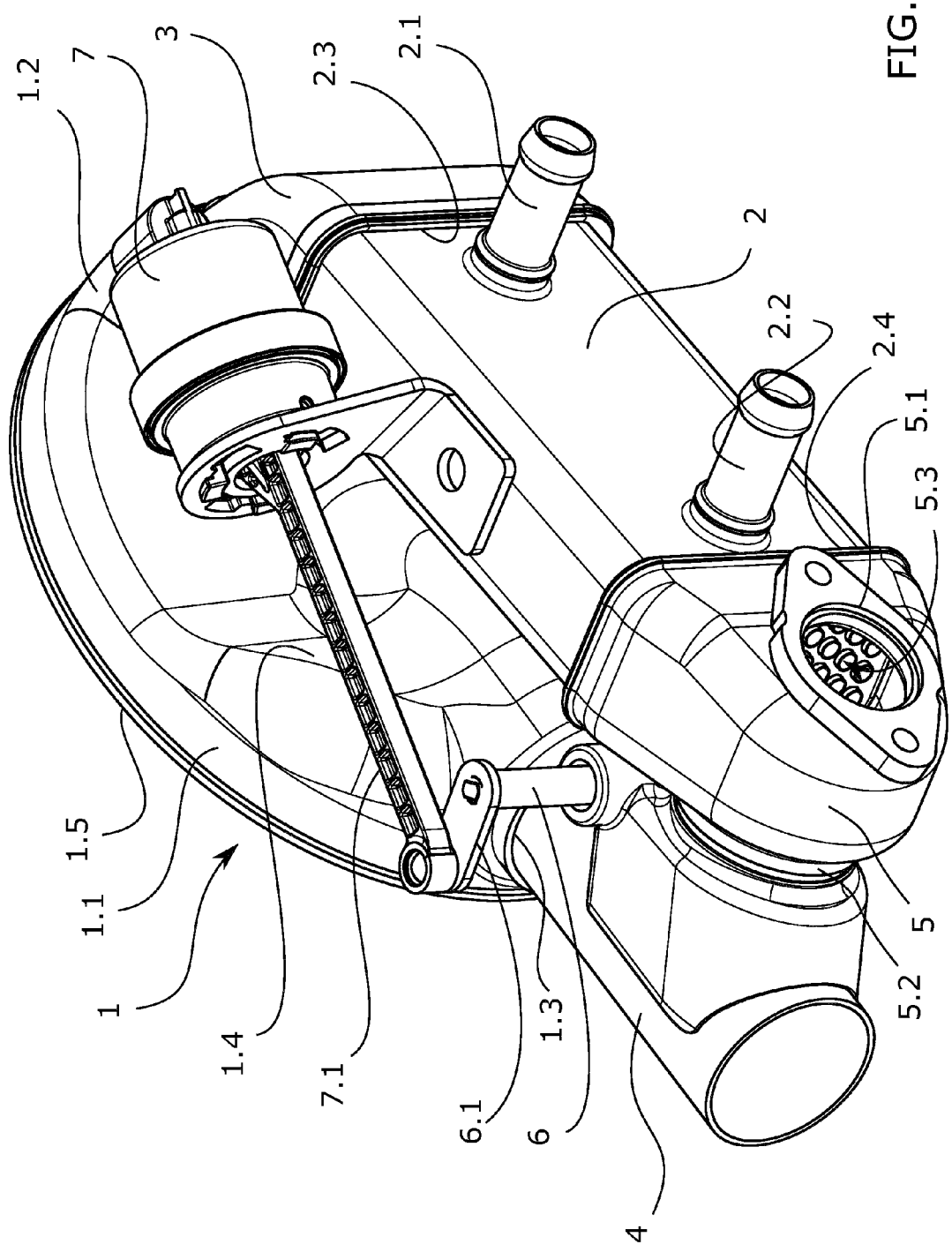
FIG. 1 shows a perspective view of a preferred example of the invention. This view allows observing in detail the position of the heat exchanger on the coupling base as well as the relative position with the exhaust conduit. The PF/DPF filter is not shown in this figure.

The present invention is a compact device for exhaust gas management in an EGR system where the preferred embodiment which will be used for the detailed description of the invention is shown in FIG. 1.

The PF/DPF filter is a device which requires a large diameter to enable processing the high volume of gas passing therethrough. The invention proposes a compact device which allows it to be directly coupled on the outlet of the PF/DPF filter without intermediate conduits; and furthermore, the set of components incorporated in this device also does not require other auxiliary conduits allowing correct connections between them.

The back of FIG. 1 shows a body, the coupling base (1), with a circular configuration along its periphery. This peripheral configuration is the seating (1.5) suitable for being coupled to the filter which in this embodiment is a cylindrical filter having a circular section.

The coupling base (1) covers the outlet of the filter by means of a surface which is configured in this embodiment by means of a perimetral side wall (1.1) and a closure bottom (1.4), both surface portions forming an inner chamber at the outlet of the filter. The perimetral side wall (1.1) slightly prolongs the length of the filter according to its longitudinal direction and the surface portion corresponding to the closure bottom (1.4) has a special configuration that will be seen to contribute to a greater degree of compaction of the device.

In this same figure the heat exchanger (2) with the two connections (2.1, 2.2) for the entry and exit of the coolant fluid is distinguished in the foreground. In this embodiment, the heat exchanger (2) has a prismatic body having an essentially rectangular section with the end that corresponds to the inlet (2.3) of the exhaust gas in fluidic communication with the inner chamber of the coupling base (1). This fluidic communication of the inlet (2.3) of the heat exchanger (2) with the inner chamber of the coupling base (1) has been carried out by means of an elbow (3) emerging from a first connection (1.2) of the coupling base (1) located in a peripheral area of the coupling base (1).

The gas which has passed through the heat exchanger (2) reaches an intermediate chamber (5) since the outlet (2.4) of the heat exchanger (2) is in fluidic communication with the inlet (5.3) of this intermediate chamber (5).

The intermediate chamber (5) has two outlets (5.1, 5.2). The orientation of the perspective view of FIG. 1 allows observing, through a first outlet (5.1) of the intermediate chamber (5), the outlet of the conduits of the core of the heat exchanger (2) through which the cooled exhaust gas flowing directly into said intermediate chamber (5) exit.

The first outlet (5.1) of the intermediate chamber (5) is intended for being connected to the conduit carrying the cooled gas to the engine intake managing the recirculated gas flow rate by means of an EGR valve which is not shown in the figures.

The coupling base (1) has a second connection (1.3) of the coupling base (1) from which an exhaust conduit (4) emerges. The position of the second connection (1.3) is also located in the periphery of the coupling base (1) but in the position diametrically opposite the position of the first connection (1.2) of the coupling base (1).

Figure 2A:
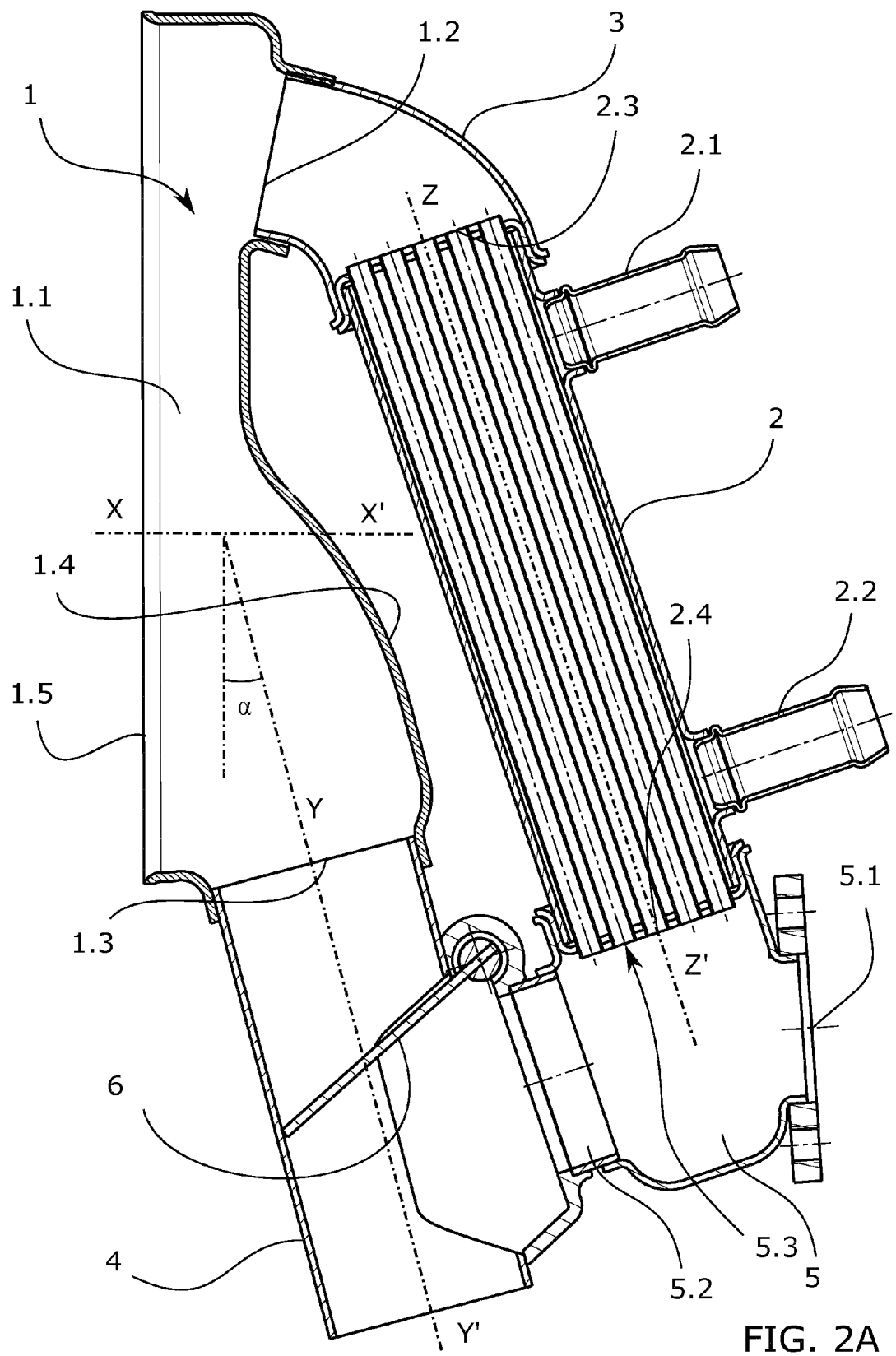
FIGS. 2A-2B show cross-section views of the device where the plane of section contains the longitudinal directions X-X', Y-Y' and Z-Z' such that it allows viewing the relative orientation of such directions.
Figure 2B:
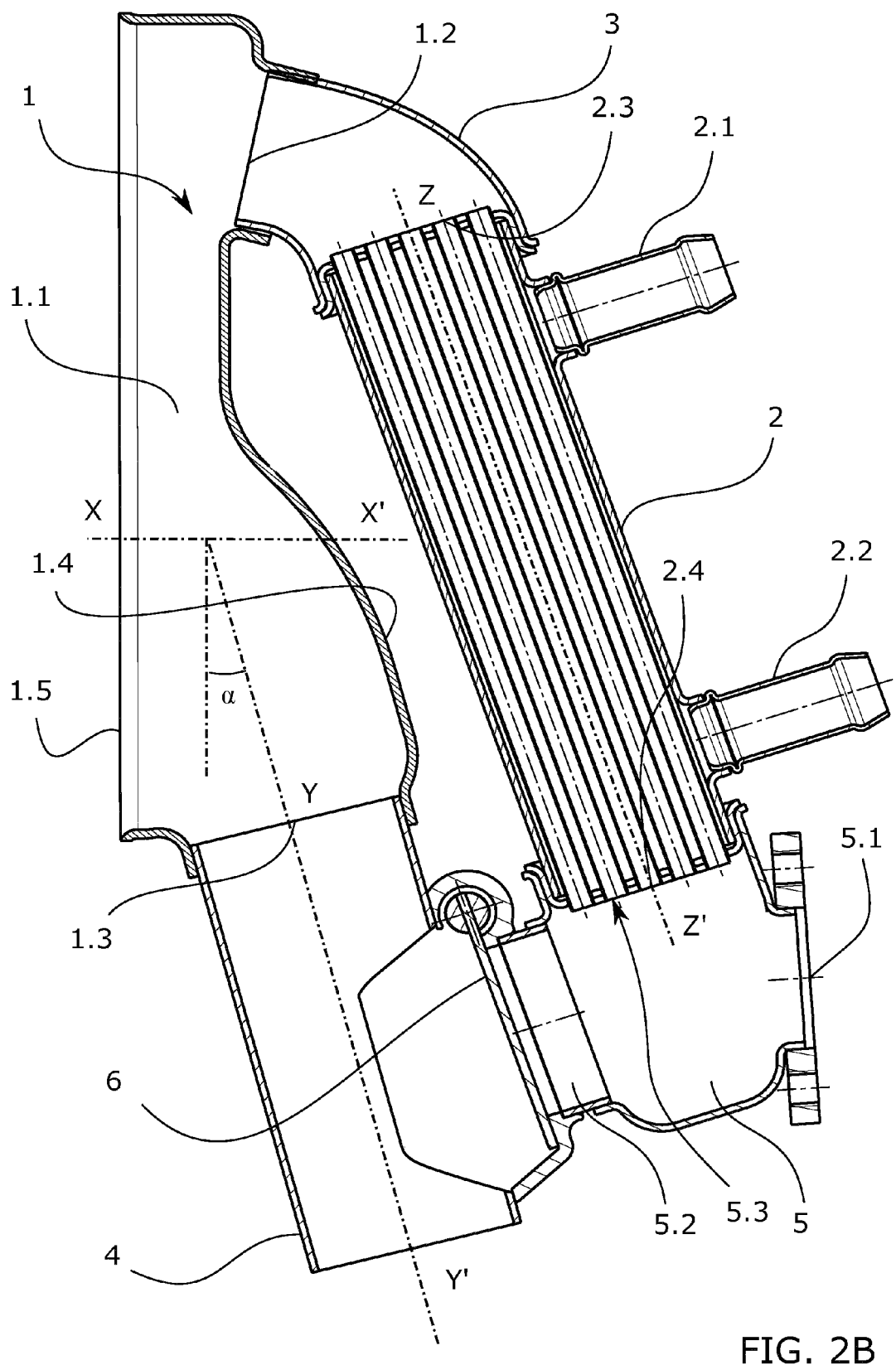

The cross-section views shown in FIGS. 2A and 2B allow observing the positions and orientations of each of the components. Particularly, in this embodiment the first connection (1.2) is located on the closure bottom (1.4) which has been configured in a slightly oblique manner so that the elbow (3) has to deflect the flow circulating therethrough to a lesser extent. With respect to the second connection (1.3), it is a larger connection covering part of the perimetral side wall (1.1) where the perimetral side wall (1.1) is wider in this area.

The longitudinal axis defined by the filter, X-X', which is perpendicular to the plane containing the seating (1.5) of the coupling base (1) suitable for closing the outlet of said filter, has been identified in these figures with a dotted line.

The longitudinal direction Z-Z' of the heat exchanger (2) and the longitudinal direction Y-Y' of the exhaust conduit (4) have been identified also by using dotted lines. These two main directions are observed in these cross-section views parallel to one another and misaligned with respect to the longitudinal direction X-X'. This misalignment has a small angle (α) allowing the end of the heat exchanger (2) corresponding to the inlet (2.3) to emerge almost directly from the surface of the closure bottom (1.4), shortening the elbow (3) communicating it in a fluidic manner with the first connection (1.2) of the coupling base (1).

The same intermediate chamber (5) described above has a second outlet (5.2) which in these two cross-section views is observed to be in fluidic communication with one side of the exhaust conduit (4).

This fluidic communication is controlled by a valve (6) allowing the two end positions shown in FIGS. 2A and 2B, an end position such as that shown in FIG. 2A closing the exhaust conduit (4) and keeping the communication between the second outlet (5.2) of the intermediate chamber (5) and the exhaust conduit (4) open; and another end position such as that shown in FIG. 2B in which the flap of the valve closes the communication between the second outlet (5.2) of the intermediate chamber (5) and the exhaust conduit (4) leaving the passage through the exhaust conduit (4) free.

In this embodiment, the fluidic communication of the outlet (5.2) has been carried out by means of a very short conduit segment the function of which is to adapt the outlet (5.2) of the intermediate chamber to the seating of the valve (6) in charge of closing this fluidic communication. This short segment also allows housing the shaft of the valve (6) allowing the rotation of the flap.

FIGS. 1, 3, 4 and 5 also show a linear actuator (7) anchored on the shell of the heat exchanger (2) from which a pushrod (7.1) emerges. The pushrod (7.1) is attached to a crank (6.1) integral with the shaft of the valve (6). The linear motion of the pushrod (7.1) of the linear actuator (7) allows the flap of the valve (6) to adopt at least the two end positions.

The fact that the valve (6) allows two end positions does not mean that the gas cannot be managed using other intermediate positions.

Figure 3:
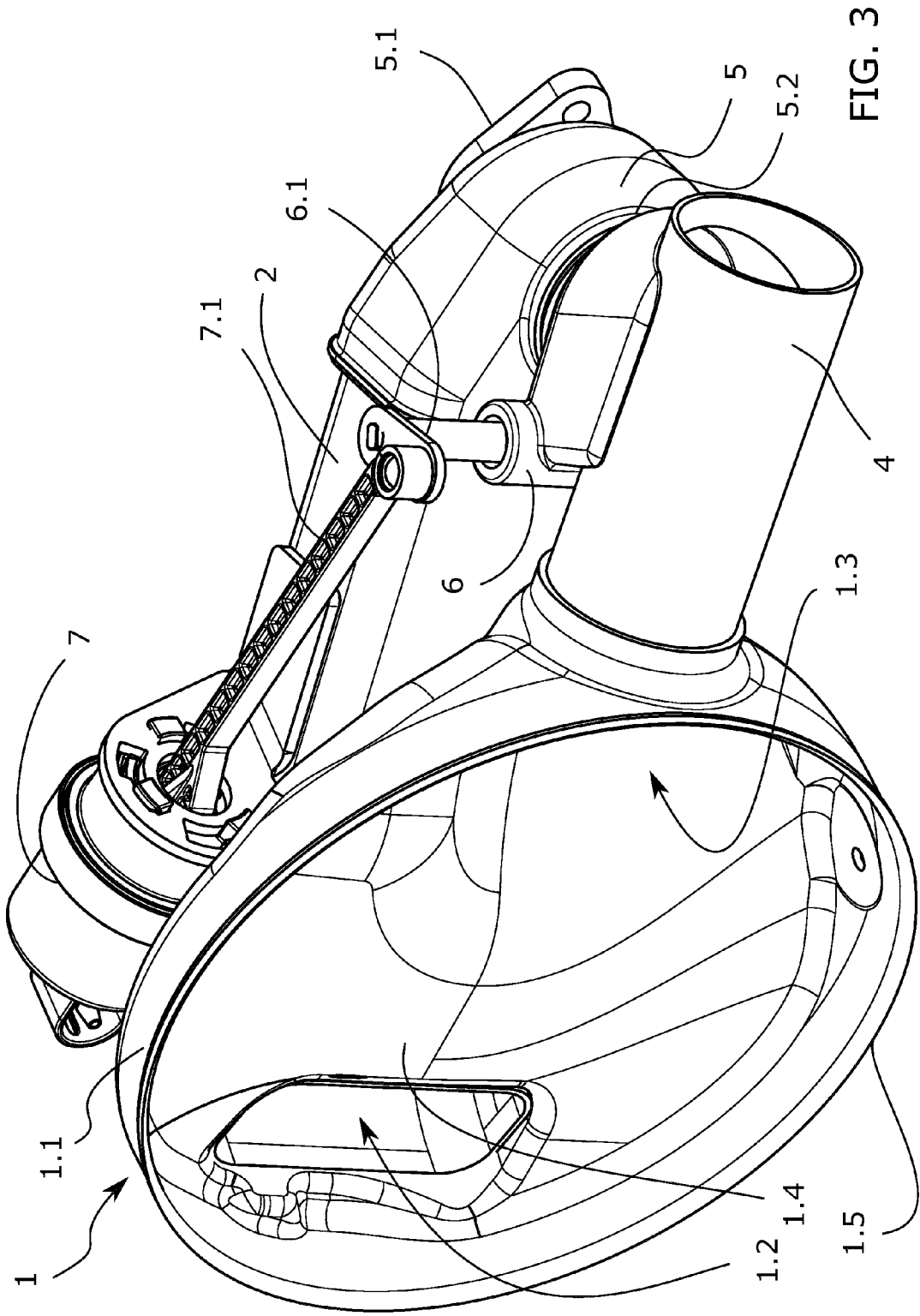
FIG. 3 shows a perspective view of the device of the embodiment shown in FIG. 1 where the viewing point is located on the other side to allow observing the inner access to the two main fluidic communications in the coupling base.
Figure 4:
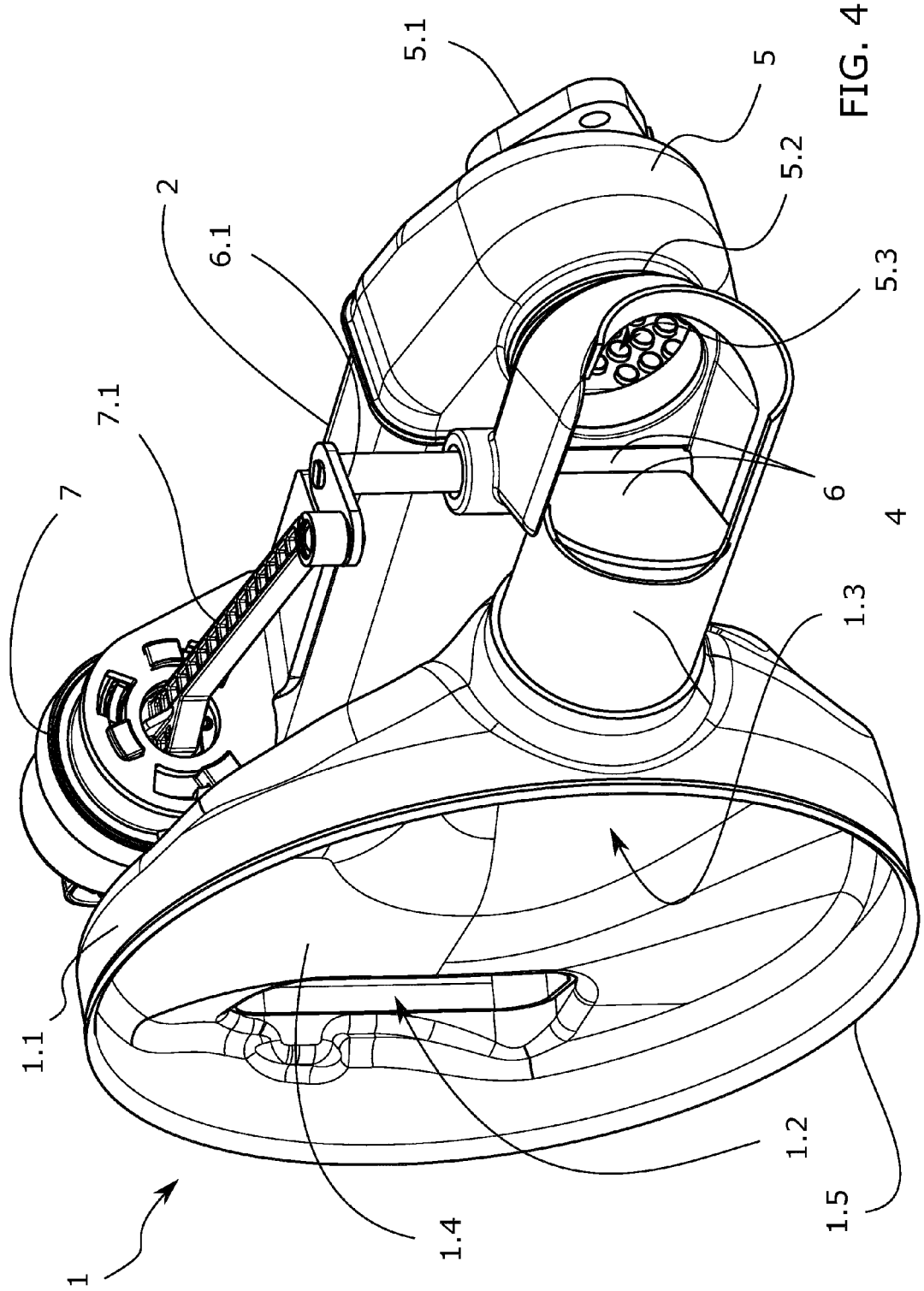
FIG. 4 shows the same perspective view as in FIG. 3 of the device of the embodiment shown in FIG. 1 except that a partial section has been made in the exhaust conduit to allow viewing the flap of the valve and even the outlet of the heat exchanger opening into the intermediate chamber.

FIGS. 3 and 4 show the device in a perspective view such that it is observed how the gas collected at the outlet of the filter has two possible alternatives, either the first connection (1.2) of the coupling base (1) or the second connection (1.3) of the coupling base and both located in opposition.

Returning to the cross-section views of FIGS. 2A and 2B, it is observed that the length of the heat exchanger is of the same order of magnitude as the width of the seating (1.5) of the coupling base (1), and therefore also of the same order of magnitude as the width of the filter. The transverse position of the heat exchanger (2) means that it extends in length covering this slightly prolonged width due to the movement imposed by the presence of the elbow (3). This length can be even greater because the essentially parallel orientation of the exhaust conduit (4) means that the attachment between the outlet (2.4) of the heat exchanger (2) and the exhaust conduit (4) can be carried out at any point of the exhaust conduit (4), although in any case, the space defined by the width of the seating (1.5) of the coupling base (1) has always been taken advantage of.

Figure 5:
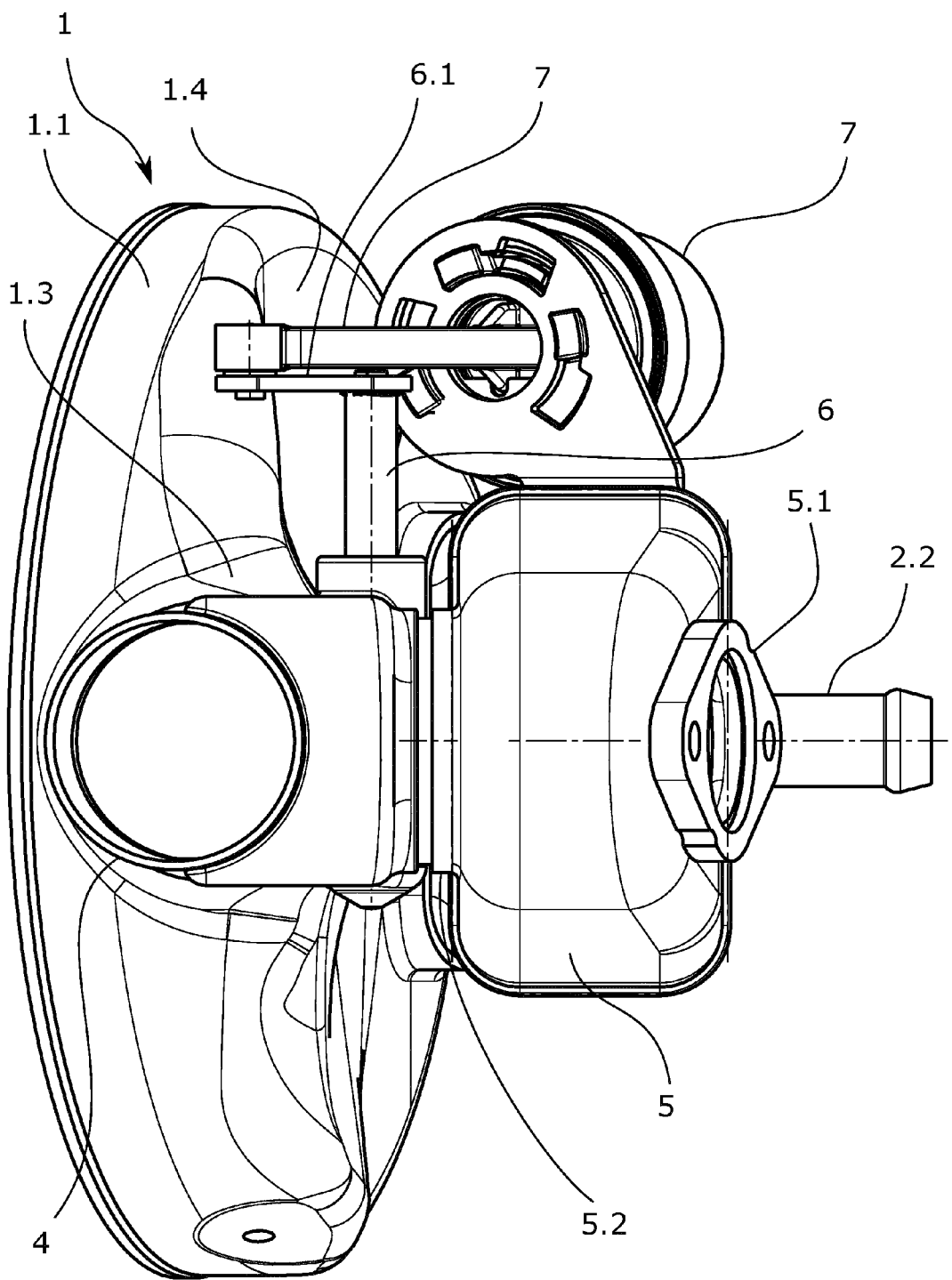
FIG. 5 shows a perspective view of the device of the embodiment shown in FIG. 1 with a viewing point having a line of sight coinciding with the longitudinal direction Z-Z'.

FIG. 5 allows observing the device in a direction of the line of sight almost coinciding with the longitudinal axis Z-Z' of the heat exchanger (2). According to this perspective, it is observed that the length of the filter has been increased by a length which is of the order of magnitude of the width of the exhaust conduit (4) plus the width of the heat exchanger (2) without using auxiliary connection conduits including the actuator (7), which is located on one side of the heat exchanger (2) according to the plane of section used in FIGS. 2A and 2B.

Once the configuration of the preferred embodiment is determined, it must be indicated that the use thereof allows an efficient management of exhaust gases exiting the PF/DPF filter.

In a first position of the valve (6), the flap is closing the passage from the second outlet (5.2) of the intermediate chamber (5) towards the exhaust conduit (4). The open exhaust conduit (4) is the simplest path for the exhaust gases so the gases are discharged directly towards the exhaust. If additionally the EGR valve located downstream from the first outlet (5.1) of the intermediate chamber is also closed, then all the exhaust gases are directed towards the exhaust.

In the second end position of the valve (6), the flap closes the passage of the exhaust conduit (4) and leaves the fluidic communication between the intermediate chamber (5) and the exhaust conduit (4) open through the second outlet (5.2) of the intermediate chamber, this fluidic communication being located downstream from the closing point of the flap in the exhaust conduit (4). This configuration prevents the direct passage of the exhaust gases exiting the filter towards the exhaust conduit (4), always making them pass through the heat exchanger (2).

The cooled gases can be directed either through the first outlet (5.1) of the intermediate chamber (5) or through the second outlet (5.2) of the intermediate chamber (5). The gases exiting through the first outlet (5.1) of the intermediate chamber (5) are managed by the EGR valve. These gases are cooled so the heat exchanger (2) performs the function of an EGR heat exchanger. These gases are the recirculated gases of the EGR system.

The second alternative is for the gases to exit through the second outlet (5.2) of the intermediate chamber (5). The cooled gases have yielded part of their heat to the coolant liquid before exiting through the exhaust. If the EGR valve is closed, all the cooled gases will be discharged directly towards the exhaust. This configuration is suitable when it is of interest to recover heat from the exhaust gases before being discharged. With this configuration, a very compact device is obtained due to the small space that it occupies and where the same heat exchanger (2) allows having the function of the heat exchanger of the EGR system and the function of heat recovery.

The invention claimed is:

1. A compact device for exhaust gas management in an EGR system suitable for being directly coupled on a PF/DPF filter wherein the PF/DPF filter extends along a longitudinal direction X-X' the end of which has an opening; and wherein the device comprises:
    a coupling base with a seating suitable for being coupled to the filter covering its opening,
    an exhaust conduit extending according to a longitudinal direction Y-Y',
    a heat exchanger comprising at least a first coolant fluid connection and a second coolant fluid connection both for the circulation of the coolant liquid; and wherein the exchanger extends along a longitudinal direction Z-Z' between an inlet for the exhaust gas to be cooled and an outlet for the cooled exhaust gas,
    an intermediate chamber comprising:
        a gas inlet in fluidic connection with the outlet of the heat exchanger,
        a first outlet connected to an EGR conduit to provide cooled exhaust gases towards an EGR valve of the EGR system,
        a second outlet connected to the exhaust conduit,
    where
        the coupling base has a first connection in fluidic connection with the inlet of the heat exchanger,
        the longitudinal direction Z-Z' of the heat exchanger is misaligned with respect to the longitudinal direction X-X' of the filter,
        the coupling base has a second connection arranged in opposition with respect to the first connection of the coupling base according to the longitudinal axis X-X' of the filter, the second connection of the coupling base being in fluidic connection with the exhaust conduit, wherein the longitudinal direction Y-Y' of said exhaust conduit is essentially parallel to the longitudinal direction of the heat exchanger and misaligned with respect to the longitudinal direction X-X' of the filter,
        the second outlet of the intermediate chamber in fluidic connection with the exhaust conduit is located on the side of the exhaust conduit; and,
        the device comprises a valve suitable for having at least two end positions, a first end position for closing the fluidic connection between the intermediate chamber and the exhaust conduit leaving a passage through the exhaust conduit free; and a second end position for closing the exhaust conduit leaving the fluidic connection between the intermediate chamber and the exhaust conduit free.

2. The device according to claim 1, wherein the coupling base is formed by at least one perimetral side wall and a closure bottom.

3. The device according to claim 2, wherein the first connection of the coupling base in fluidic connection with the inlet of the heat exchanger is located at the closure bottom of the coupling base.

4. The device according to claim 2, wherein the second connection of the coupling base in fluidic connection with the exhaust conduit is located in the perimetral wall of the coupling base.

5. The device according to claim 3 wherein
    the perimetral wall of the coupling base is larger in the area connected to the exhaust conduit than in the rest of the perimeter,
    the first fluidic connection of the coupling base with the inlet of the heat exchanger is by a connection elbow for deflecting the gas flow,
    the longitudinal direction Y-Y' of the exhaust conduit and the longitudinal direction Z-Z' of the heat exchanger show an angle of inclination ($\alpha$) greater than zero with respect to a plane perpendicular to the longitudinal direction X-X' of the filter to reduce gas deflection.

6. The device according to claim 5, wherein the angle of inclination ($\alpha$) of the longitudinal direction Y-Y' of the exhaust conduit and the longitudinal direction Z-Z' of the heat exchanger with respect to the plane perpendicular to the longitudinal direction X-X' of the filter is between 0 and 40 degrees.

7. The device according to claim 1 wherein the valve is housed inside the exhaust conduit.

* * * * *